United States Patent
Sen et al.

(10) Patent No.: US 12,189,629 B2
(45) Date of Patent: Jan. 7, 2025

(54) OPTIMIZING JOB RUNTIMES VIA PREDICTION-BASED TOKEN ALLOCATION

(71) Applicant: Microsoft Technology Licensing, LLC, Redmond, WA (US)

(72) Inventors: Rathijit Sen, Madison, WI (US); Alekh Jindal, Sammamish, WA (US); Anish Yatin Pimpley, Somerville, MA (US); Shuo Li, Newton, MS (US); Anubha Srivastava, McAllen, TX (US); Vishal Lalchand Rohra, Boston, MA (US); Yi Zhu, Boston, MA (US); Hiren Shantilal Patel, Bothell, WA (US); Shi Qiao, Mercer Island, WA (US); Marc Todd Friedman, Seattle, WA (US); Clemens Alden Szyperski, Bellevue, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 122 days.

(21) Appl. No.: 17/060,053

(22) Filed: Sep. 30, 2020

(65) Prior Publication Data

US 2022/0100763 A1 Mar. 31, 2022

(51) Int. Cl.
*G06F 16/00* (2019.01)
*G06F 16/2453* (2019.01)
*G06N 20/00* (2019.01)

(52) U.S. Cl.
CPC ....... *G06F 16/24545* (2019.01); *G06N 20/00* (2019.01)

(58) Field of Classification Search
CPC ................ G06F 16/24545; G06N 20/00
(Continued)

(56) References Cited

U.S. PATENT DOCUMENTS

2020/0073987 A1* 3/2020 Perumala .......... G06F 16/24545
2020/0125568 A1* 4/2020 Idicula .................... G06N 20/20
(Continued)

OTHER PUBLICATIONS

Ma, et al., Online Planner Selection with Graph Neural Networks and Adaptive Scheduling, In Repository of arXiv:1811.00210v3, Feb. 26, 2019, 8 Pages.
(Continued)

*Primary Examiner* — Irete F Ehichioya
*Assistant Examiner* — Shirley D Hicks
(74) *Attorney, Agent, or Firm* — Barta Jones, PLLC

(57) ABSTRACT

Solutions for optimizing job runtimes via prediction-based token allocation includes receiving training data comprising historical run data, the historical run data comprising job characteristics, runtime results, and a token count for each of a plurality of prior jobs, and the job characteristics comprising an intermediate representation and job graph data; based at least on the training data, training a token estimator, the token estimator comprising a machine learning (ML) model; receiving job characteristics for a user-submitted job; based at least on the received job characteristics, generating, with the token estimator, token prediction data for the user-submitted job; selecting a token count for the user-submitted job, based at least on the token prediction data; identifying the selected token count to an execution environment; and executing, with the execution environment, the user-submitted job in accordance with the selected token count.

20 Claims, 8 Drawing Sheets

(58) Field of Classification Search
USPC .................................................. 707/600–899
See application file for complete search history.

(56) References Cited

U.S. PATENT DOCUMENTS

| 2020/0292608 | A1* | 9/2020 | Yan | G06N 3/044 |
| 2020/0401093 | A1* | 12/2020 | Song | G06F 16/2471 |
| 2021/0247998 | A1* | 8/2021 | Zhang | G06N 3/044 |

OTHER PUBLICATIONS

"Start Building on AWS Today", Retrieved from: https://aws.amazon.com./, Retrieved on Jun. 17, 2020, 23 Pages.

Alipourfard, et al., "CherryPick: Adaptively Unearthing the Best Cloud Configurations for Big Data Analytics", In Proceedings of the 14th USENIX Symposium on Networked Systems Design and Implementation, 2017, pp. 469-482.

Amdahl, Gene M., "Validity of the Single Processor Approach to Achieving Large Scale Computing Capabilities", In Proceedings of the Spring Joint Computer Conference, Apr. 18, 1967, pp. 483-485.

Bag, et al., "Towards Plan-Aware Resource Allocation in Serverless Query Processing", In Proceedings of the 12th USENIX Workshop on HotTopics in Cloud Computing, 2020, 6 Pages.

Bai, et al., "SimGNN: A Neural Network Approach to Fast Graph Similarity Computation", In Proceedings of the 12th ACM International Conference on Web Search and Data Mining, Feb. 11, 2019, pp. 384-392.

Baxter, Jonathan, "A Model of Inductive Bias Learning", In Journal of Artificial Intelligence Research, Mar. 1, 2000, pp. 149-198.

Bresson, et al., "Residual Gated Graph ConvNets", In Repository of arXiv:1711.07553v1, Nov. 20, 2017, 10 Pages.

Chaiken, et al., "SCOPE: Easy and Efficient Parallel Processing of Massive Data Sets", In Proceedings of the VLDB Endowment, vol. 1, Issue 2, Aug. 1, 2008, pp. 1265-1276.

Chen, et al., "XGBoost: A Scalable Tree Boosting System", In Proceedings of the 22nd ACM SIGKDD International Conference on Knowledge Discovery and Data Mining, Aug. 13, 2016, pp. 785-794.

Chung, et al., "Stratus: Cost-Aware Container Scheduling in the Public Cloud", In Proceedings of the ACM Symposium on Cloud Computing, Oct. 11, 2018, pp. 121-134.

Dutt, et al., "Selectivity Estimation for Range Predicates Using Lightweight Models", In Proceedings of the VLDB Endowment, vol. 12, Issue 9, May 1, 2019, pp. 1044-1057.

Dwivedi, et al., "Benchmarking Graph Neural Networks", In Repository of arXiv:2003.00982v3, Jul. 3, 2020, 30 Pages.

Fan, et al., "A Comparative Exploration of ML Techniques for Tuning Query Degree of Parallelism", In Repository of arXiv:2005.08439v1, May 18, 2020, 14 Pages.

Fan, et al., "Automated Tuning of Query Degree of Parallelism via Machine Learning", In Proceedings of the 3rd International Workshop on Exploiting Artificial Intelligence Techniques for Data Management, Jun. 14, 2020, 4 Pages.

Ferguson, et al., "Jockey: Guaranteed Job Latency in Data Parallel Clusters", In Proceedings of the 7th ACM European Conference on Computer Systems, Apr. 10, 2012, pp. 99-112.

Gori, et al., "A New Model for Learning in Graph Domains", In Proceedings of IEEE International Joint Conference on Neural Networks, Jan. 2005, 6 Pages.

Hochreiter, et al., "Long Short-Term Memory", In Journal of Neural Computation, vol. 9, Issue 8, Nov. 15, 1997, pp. 1735-1780.

Jindal, et al., "Peregrine: Workload Optimization for Cloud Query Engines", In Proceedings of the ACM Symposium on Cloud Computing, Nov. 20, 2019, pp. 416-427.

Jyothi, et al., "Morpheus: Towards Automated SLOs for Enterprise Clusters", In Proceedings of 12th USENIX Symposium on Operating Systems Design and Implementation, Nov. 2, 2016, pp. 117-134.

Khan, et al., "Hadoop Performance Modeling for Job Estimation and Resource Provisioning", In Journal of IEEE Transactions on Parallel and Distributed Systems, vol. 27, Issue 2, Feb. 2016, pp. 441-454.

Kipf, et al., "Learned Cardinalities: Estimating Correlated Joins with Deep Learning", In Repository of arXiv:1809.00677v2, Dec. 18, 2018, 8 Pages.

Kipf, et al., "Semi-Supervised Classification with Graph Convolutional Networks", In Repository of arXiv:1609.02907v1, Sep. 9, 2016, 10 Pages.

Krishnan, et al., "Learning to Optimize Join Queries with Deep Reinforcement Learning", In Repository of arXiv:1808.03196v1, Aug. 9, 2018, 15 Pages.

Krizhevsky, et al., "ImageNet Classification with Deep Convolutional Neural Networks", In Advances in Neural Information Processing Systems, Dec. 2012, 9 Pages.

Lecun, et al., "Gradient-Based Learning Applied to Document Recognition", In Proceedings of the IEEE, vol. 86, Issue 11, Nov. 1998, 46 Pages.

Marcus, et al., "Bao: Learning to Steer Query Optimizers", In Repository of arXiv:2004.03814v1, Apr. 8, 2020, 16 Pages.

Marcus, et al., "Neo: A Learned Query Optimizer", In Proceedings of the VLDB Endowment, vol. 12, No. 11, Jul. 2019, 18 Pages.

Mitchell, Tom M., "The Need for Biases in Learning Generalizations", In New Jersey: Department of Computer Science, Laboratory for Computer Science Research, May 1980, 3 Pages.

Monti, et al., "Geometric Deep Learning on Graphs and Manifolds Using Mixture Model CNNS", In Proceedings of the IEEE Conference on Computer Vision and Pattern Recognition, 2017, pp. 5115-5124.

Negi, et al., "Cost-Guided Cardinality Estimation: Focus Where it Matters", In Proceedings of the IEEE 36th International Conference on Data Engineering Workshops, Apr. 20, 2020, 4 Pages.

Olston, et al., "Pig Latin: A Not-So-Foreign Language for Data Processing", In Proceedings of the ACM SIGMOD International Conference on Management of Data, Jun. 9, 2008, pp. 1099-1110.

Ortiz, et al., "An Empirical Analysis of Deep Learning for Cardinality Estimation", In Repository of arXiv:1905.06425v2, Sep. 12, 2019, 17 Pages.

Park, et al., "QuickSel: Quick Selectivity Learning with Mixture Models", In Repository of arXiv:1812.10568v1, Dec. 26, 2018, 18 Pages.

Rajan, et al., "PerfOrator: Eloquent Performance Models for Resource Optimization", In Proceedings of the 7th ACM Symposium on Cloud Computing, Oct. 5, 2016, pp. 415-427.

Scarselli, et al., "The Graph Neural Network Model", In Journal of IEEE Transactions on Neural Networks, vol. 20, Issue 1, Dec. 9, 2008, 32 Pages.

Sen, et al., "AutoToken: Predicting Peak Parallelism for Big Data Analytics at Microsoft", In Proceedings of the VLDB Endowment, vol. 13, No. 12, Aug. 2020, pp. 3326-3339.

Sutton, et al., "Reinforcement Learning: An Introduction", In Publication of MIT Press, Feb. 1998, 334 Pages.

Thusoo, et al., "Hive: A Warehousing Solution Over a Map-Reduce Framework", In Proceedings of the VLDB Endowment, vol. 2, Issue 2, Aug. 24, 2009, pp. 1626-1629.

"Amazon Athena Documentation", Retrieved from: https://docs.amazonaws.cn/en_us/athena/latest/APIReference/athena-api.pdf, May 18, 2017, 121 Pages.

Vaswani, et al., "Attention is All You Need", In Proceedings of 31st Conference on Neural Information Processing Systems, Dec. 4, 2017, 11 Pages.

Veličković, et al., "Graph Attention Networks", In Repository of arXiv:1710.10903, Oct. 30, 2017, 11 Pages.

Venkataraman, et al., "Ernest: Efficient Performance Prediction for Large-Scale Advanced Analytics", In Proceedings of the 13th USENIX Symposium on Networked Systems Design and Implementation, Mar. 16, 2016, pp. 363-378.

Virtanen, et al., "SciPy 1.0: Fundamental Algorithms for Scientific Computing in Python", In Journal of Nature Methods, vol. 17, Mar. 2020, pp. 261-272.

Wang, et al., "A Novel Method for Tuning Configuration Parameters of Spark Based on Machine Learning", In Proceedings of the IEEE

(56) References Cited

OTHER PUBLICATIONS

18th International Conference on High Performance Computing and Communications, Dec. 12, 2016, pp. 586-593.

Woltmann, et al., "Cardinality Estimation with Local Deep Learning Models", In Proceedings of the 2nd International Workshop on Exploiting Artificial Intelligence Techniques for Data Management, Jul. 5, 2019, 8 Pages.

Wu, et al., "Towards a Learning Optimizer for Shared Clouds", In Proceedings of the VLDB Endowment, vol. 2, Issue 3, Nov. 1, 2018, pp. 210-222.

Zhang, et al., "Benchmarking Approach for Designing a MapReduce Performance Model", In Proceedings of the 4th ACM/SPEC International Conference on Performance Engineering, Apr. 21, 2013, pp. 253-258.

"Optimize your Costs by Developing in the Cloud. Invent with Purpose", Retrieved from: https://azure.microsoft.com/en-us/, Retrieved on Jun. 17, 2020, 12 Pages.

"International Search Report and Written Opinion Issued in PCT Application No. PCT/US21/037149", Mailed Date: Oct. 7, 2021, 12 Pages.

Tigani, et al., "Google BigQuery Analytics", In Publication of John Wiley & Sons, 2014, 530 Pages.

* cited by examiner

OPTIMIZING JOB RUNTIMES VIA PREDICTION-BASED TOKEN ALLOCATION

BACKGROUND

Optimizing query workloads and resource allocation for queries involving large data sets reduces costs for cloud data services. In some scenarios, users submit computational tasks (e.g., jobs) as queries of large data sets, and resources are allocated based on default values, for example, a fixed number or a fixed percentage of resources. Resources may be allocated in units identified as tokens, but if a user does not over-ride a default allocation and indicate an optimal number of tokens to be requested (reserved) for a job, efficiency may suffer. For example, the job may not require the selected number of tokens, resulting in wasteful over-allocation. Alternatively, the job may require a longer time for completion (e.g., a longer runtime), if an insufficient number of tokens is selected.

The relationship between allocated resources and execution time for a query is not straight forward. The lack of tools to understand the resources versus runtime relationship makes it challenging for users to optimize resource allocations for jobs.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Solutions for optimizing job runtimes via prediction-based token allocation includes receiving training data comprising historical run data, the historical run data comprising job characteristics (which include cardinalities), runtime results, and a token count for each of a plurality of prior jobs, and the job characteristics comprising an intermediate representation and job graph data; based at least on the training data, training a token estimator, the token estimator comprising a machine learning (ML) model; receiving job characteristics for a user-submitted job; based at least on the received job characteristics, generating, with the token estimator, token prediction data for the user-submitted job; selecting a token count for the user-submitted job, based at least on the token prediction data; identifying the selected token count to an execution environment; and executing, with the execution environment, the user-submitted job in accordance with the selected token count.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
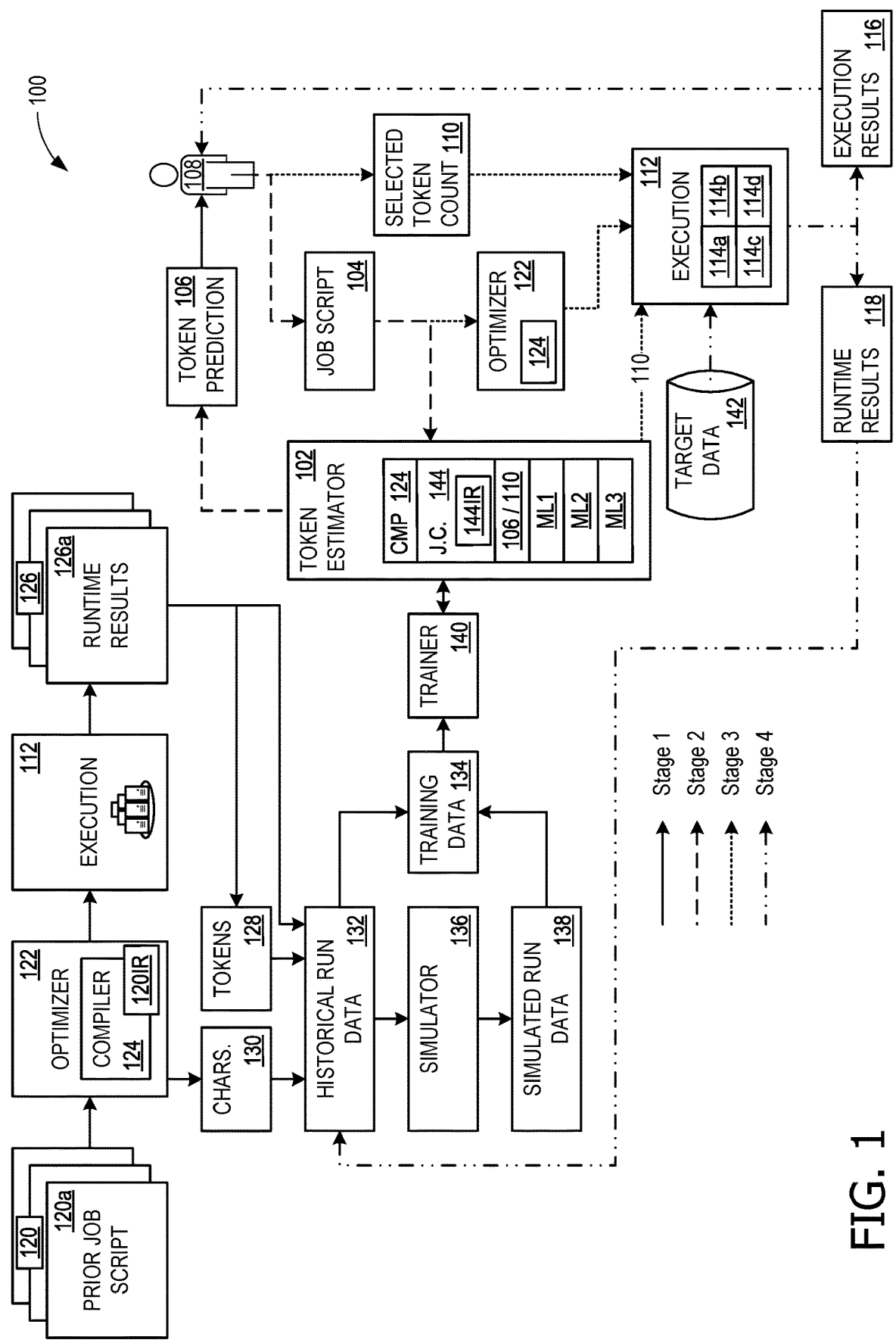
FIG. 1 illustrates an arrangement for advantageously optimizing job runtimes via prediction-based token allocation.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Efficient resource allocation may improve resource availability and reduce operational costs because of increased scale of operation and the ability to have fine-grained control on resources allocated to each task. However, identifying the best-fit resource requirements for computational tasks in modern big-data infrastructures has proven to be a challenge. Thus, solutions for optimizing job runtimes via prediction-based token allocation includes receiving training data comprising historical run data, the historical run data comprising job characteristics, runtime results, and a token count for each of a plurality of prior jobs, and the job characteristics comprising an intermediate representation and job graph data; based at least on the training data, training a token estimator, the token estimator comprising a machine learning (ML) model; receiving job characteristics for a user-submitted job; based at least on the received job characteristics, generating, with the token estimator, token prediction data for the user-submitted job; selecting a token count for the user-submitted job, based at least on the token prediction data; identifying the selected token count to an execution environment; and executing, with the execution environment, the user-submitted job in accordance with the selected token count.

Aspects of the disclosure improve the efficiency of computing platforms and operations by generating, with a token estimator, token prediction data for user-submitted jobs. The user-submitted jobs may then be executed, with an execution environment, in accordance with the selected token count. This may both reduce wasteful over-allocation of tokens and prevent overly-long runtimes due to insufficient tokens. SCOPE is a declarative language used for data analysis and data mining applications, and may be used to author job scripts that perform serverless queries. Cosmos is a globally distributed, multi-model database service that may be used as an example execution environment.

Aspects of the disclosure operate in an unconventional manner by the token estimator determining initial point prediction runtimes, estimating parameters of a power law function, fitting the power law function to the initial point prediction runtimes, and predicting a larger number of runtime values using the power law function. Aspects of the disclosure further operate in an unconventional manner by generating simulated run data (e.g., using constant token-seconds values as an invariant) based on historical run data, and augmenting training data with the simulated run data. The training data may be used to train one or more of a plurality of different neural network (NN) configurations used by the token estimator. The disclosed token estimator is able to advantageously provide predictions for even non-recurring (ad hoc) jobs.

FIG. 1 illustrates an arrangement 100 for advantageously optimizing job runtimes via prediction-based token allocation. A token estimator 102 receives a user-submitted job 104 in the form of a job script and generates token prediction data 106. In some examples, as will be described in relation to FIG. 4, token estimator 102 is within an optimizer 122. In some examples, user-submitted job 104 comprises a serverless query. In some examples, token prediction data 106 is provided to a user 108 (e.g., the user who submitted user-submitted job 104), who selects a selected token count 110 to use when user-submitted job 104 is executing in an execution environment 112. In some examples, token estimator 102 automatically provides selected token count 110 directly to execution environment 112 as a recommended token count, as part of token prediction data 106. In some examples, token prediction data 106 is presented to user 108 as a graphical presentation 200, which is described in further detail in relation to FIG. 2A, permitting user 108 to provide input for selecting selected token count 110.

In some examples, execution environment 112 includes a cloud-based database service and associated hardware. As indicated, execution environment 112 includes resource units (tokens) 114a-114d, such as virtual machine cores and associated memory. In some examples, each of tokens 114a, 114b, 114c, and 114d corresponds to two cores and six gigabytes (6 GB) of memory in execution environment 112. It should be understood that, in practice, an execution environment may provide a larger number of tokens, numbering in the thousands or greater. Execution environment 112 runs user-submitted job 104 (e.g., a compiled version, as described below) in accordance with selected token count 110, and outputs execution results 116. Output execution results 116 from user-submitted job 104 are provided to user 108, and runtime results 118 for user-submitted job 104, along with selected token count 110 and job characteristics 144 (described in further detail below), are provided as historical run data 132, which may be used to further improve the performance of token estimator 102. This is because the runtime for user-submitted job 104 is based at least on selected token count 110 and job characteristics 144. Using this information may improve an ML model or models used in token estimator 102.

Four stages of operations are illustrated in FIG. 1 using different types of lines: solid, dashed, and dash-dot. Stage 1 includes the training of token estimator 102. Stage 2 includes generating token prediction data 106. Stage 3 includes submitting user-submitted job 104 to execution environment 112. Stage 4 includes executing user-submitted job 104 in execution environment 112, returning execution results 116 to user 108, and advantageously leveraging runtime results 118 to further enhancing training data 134.

Token estimator 102 comprises at least one ML model, which may include XGBoost ML1 (which is a gradient boosted decision tree, rather than a neural network model), a multi-layer fully connected neural network ML2, and/or a graph neural network (GNN) ML3. Additional ML models may also be used in addition, or instead. In some examples, XGBoost ML1 is used for generating individual point prediction runtime values directly from job characteristics 144 (e.g., an intermediate representation of the job, job graph data, and cardinalities) and a given token count. In some examples, a job graph is a directed acyclic graph (DAG) of the operators used. In some examples, the multi-layer fully connected NN ML2 and/or the GNN ML3 generate curve data (see FIG. 2B), for example a power law curve, and use the curve data to calculate a plurality of point prediction runtime values. This process is described in further detail in relation to FIGS. 2A and 2B.

Figure 2A:
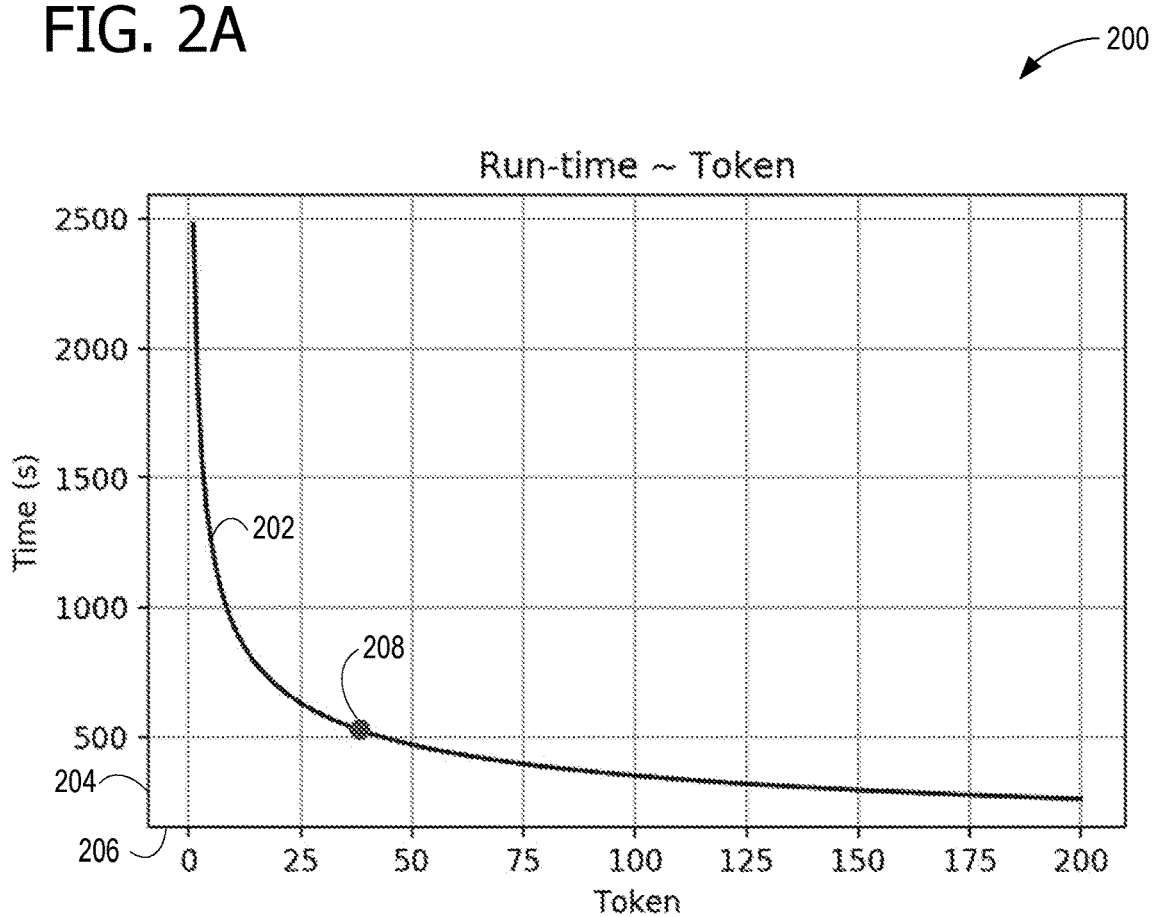
FIG. 2A illustrates token prediction data in the form of a power law function curve, as may be generated in the arrangement of FIG. 1.

Turning briefly to FIG. 2A, token prediction data 106 is illustrated in the form of graphical presentation 200 that relates a plurality of predicted runtimes with selectable token counts. For example, curve data 202 is plotted as a predicted runtime, along axis 204, as a function of selectable token counts, along axis 206. That is, curve data 202 indicates that, if user 108 selects a particular token count along axis 206, then user 108 should expect a runtime indicated by curve data 202, read from axis 204. For example, if user 108 selects 200 tokens, the job (for which graphical presentation 200 has been generated) should take approximately 200 seconds to complete, whereas if user 108 selects 10 tokens, the job should take approximately 1000 seconds to complete.

In some examples, graphical presentation 200 of token prediction data 106 is presented to user 108, to inform user 108 of the expected performance levels available for user-submitted job 104, and the cost (in terms of token allocation) to achieve the various performance levels. In some examples, a recommended token count 208 may be provided as an annotation to graphical presentation 200. In some examples, a recommended token count 208 may be calculated as an inflection point (e.g., a second derivative value of zero) of curve data 202, although other criteria may be used for determining recommended token count 208. In some examples, curve data 202 is additionally, or instead, provided to user 108 as a tabulated presentation that relates the plurality of predicted runtimes with the selectable token counts.

In some examples, recommended token count 208 may be provided to user 108 as a single output value in token prediction data 106, and curve data 202 is not provided. In some examples, token prediction data 106 is provided by token estimator 102 to execution environment 112 directly. For example, token estimator may provide token prediction data 106, comprising recommended token count 208, as selected token count 110 to execution environment 112. In such examples, execution environment 112 uses the token count value from token estimator 102, without needing input from user 108. However, in some examples, user 108 retains the ability to specify selected token count 110, so that user 108 may decide the value of a shortened runtime in view of the expense.

Figure 2B:
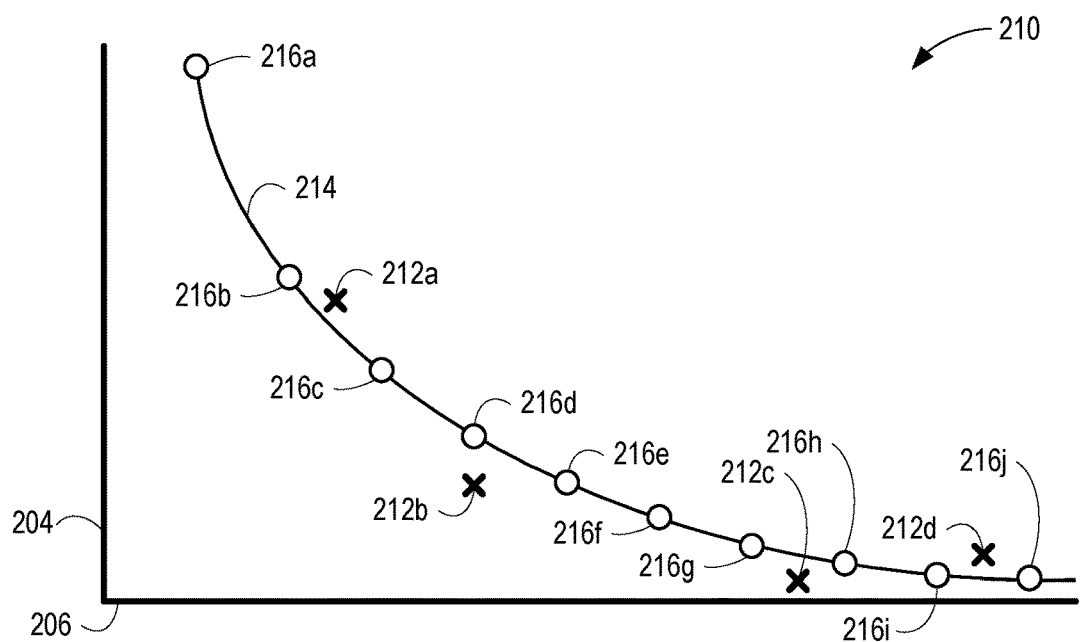
FIG. 2B graphically illustrates the generation of the curve of FIG. 2A.

FIG. 2B graphically illustrates one process for generating curve data 202, in plot 210. There are alternative processes. One process, (not using initial point prediction runtimes 212a-212d shown in FIG. 2B) employs ML2 and/or ML3 to predict curve parameters directly. Training data 134 for ML2 and ML3 therefore additionally has curve parameter information. A curve is fitted to a series of point data for each job, where each point corresponds to job run time with a different token count. The parameters of those curves are used (along with other data) to train the models. This series of point data may also be obtained from simulation, where the simulation uses the actual job skyline for some token count, then simulates/estimates the new skyline and run time for a different token count. (See the description of FIGS. 3A and 3B). As another example, job flighting data, in which a job is flighted with different token counts, may be used to obtain the series of point data to fit the curves. As a further, a combination of job flighting data and simulated data may be used to obtain the series of point data to fit the curves.

Another process, using ML1 (e.g., XGBoost) involves additional stages during prediction (with a trade-off of not requiring curve parameter information within the training data): a candidate curve 214 is generated by fitting a function to initial point prediction runtimes 212a-212d, for each of a plurality of token count values. For example, initial point prediction runtimes 212a, 212b, 212c, and 212d are each determined, and then candidate curve 214 is fit to the data. In some examples, candidate curve 214 is a power law function, given by:

$$\text{Runtime}=f(\text{token\_count})=B\times[\text{token\_count}]^A \quad \text{Eq. (1)}$$

where A is a first parameter of the power law function shown in Equation 1, and B is a second parameter. In Eq. 1, a selectable token count value is exponentiated by first parameter A and multiplied by second parameter B. In some examples, ML2 and/or ML3 are used as the ML model in token estimator 102 for generating candidate curve 214. Further detail is provided in relation to FIG. 5, for example, the generation of curve parameter prediction 514.

In general, the predicted runtimes for a job should be monotonically non-increasing as a function of token count. However, individual point prediction runtime values might provide spurious results that do not follow this expectation. As indicated, initial point prediction runtime 212d is higher than initial point prediction runtime 212c, even with a higher token count. When candidate curve 214 is fit to initial point prediction runtimes 212a, 212b, 212c, and 212d, though, and set to curve data 202, prediction runtime values 216a-216j may calculated from curve data 202. Prediction runtime values 216a-216j generated in this manner (individual predicted points to a curve, then to individual calculated points) do follow the expectation of being monotonically non-increasing as a function of token count.

Returning to FIG. 1, in order for token estimator 102 to provide valuable predictions (e.g., token prediction data 106), token estimator 102 requires training. At an earlier time, a plurality of prior jobs 120 had been received as job scripts, which includes a prior job 120a. Prior jobs 120 may be serverless queries, similar to user-submitted job 104, and some may be recurring jobs. Prior jobs 120 had been submitted to optimizer 122 that includes a compiler 124, which is able to generate intermediate representations 120IR of job scripts for execution. For example, compiler 124 may have generated an intermediate representation (one of 120IR) of prior job 120a. This may be used in some examples when job scripts are in a high level language, and execution environment 112 requires a lower level language. In this example, execution environment 112 ran the compiled version of prior job 120a and runtime results 126a were collected. Runtime results 126 represents execution time information for prior jobs 120.

A token count 128 for each of prior jobs 120 is received as historical run data 132, along with job characteristics 130 for each of prior jobs 120, and runtime results 126 (each of which is correlated with one of prior jobs 120). In some examples, token count 128 is obtained from the peak tokens used by a job during its run, and is determined from runtime results 126. Job characteristics 130 comprises intermediate representations 120IR and job graph data (e.g., in a DAG) for each of prior jobs 120. In some examples, other information, is also included within job characteristics 130, such as a size of a data set searched in a query (e.g., cardinalities of target data set 142), a type of data in the data set searched in the query, an indication of operators used, and/or an indication of an order of the operators used. Historical run data 132 is received as training data 134. Unfortunately, however, historical run data 132 provides a single runtime data point for a given set of job characteristics for each job in prior jobs 120 (unless a particular job is a recurring job, and different token counts are used at different times). In some scenarios, additional training data may improve performance of the MLs in token estimator 102 (e.g., ML1, ML2, and ML3).

A simulator 136 generates simulated run data 138 that is based at least on historical run data 132. For example, simulator 136 intakes historical run data 132, which includes a single runtime value, and simulates runtime results for a plurality of simulated token counts. That is, simulator 136 determines what the runtime should have been for a job in historical run data 132, if the token allocation had been different. In some examples, simulator 136 calculates runtimes based on the area under a job skyline being constant. This is an area-preserving invariant for the simulator 136.

Figure 3A:
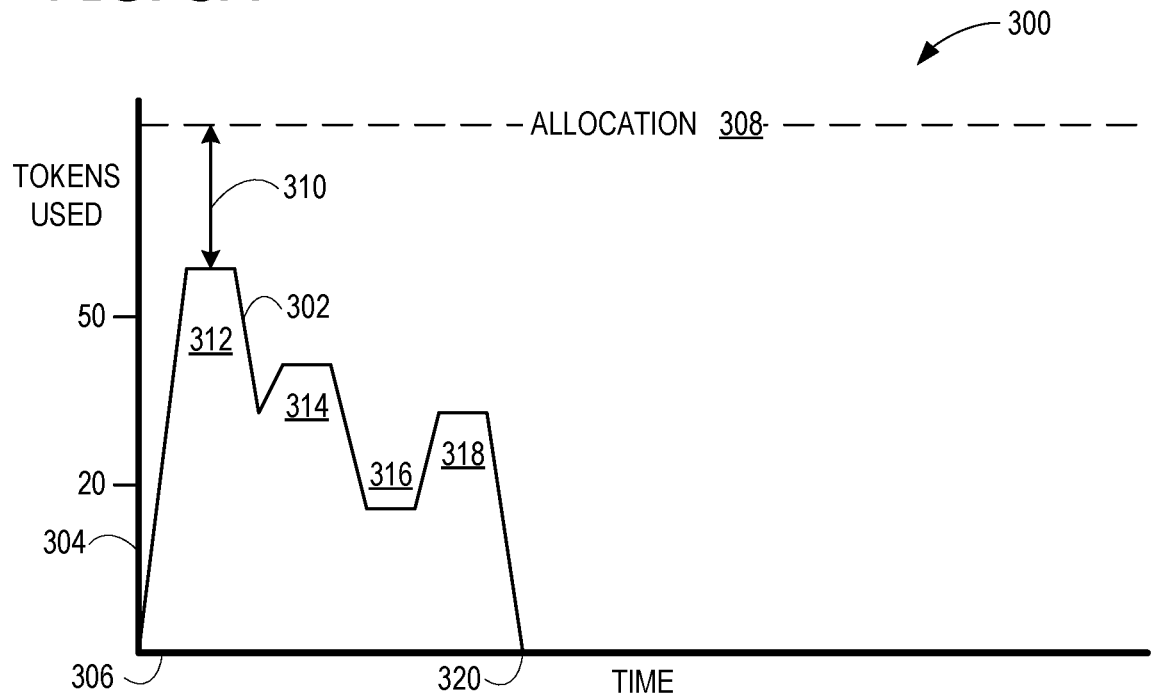
FIG. 3A illustrates an exemplary skyline data plot, as may be generated in the arrangement of FIG. 1.

FIG. 3A illustrates a job skyline 302 for a job (e.g., prior job 120a) with a token allocation 308 that exceeds 50 tokens, in a plot 300. Skyline 302 is plotted as the number of tokens actually used, along axis 304, versus time increment during execution, along axis 306. During execution of the job, execution environment 112 allocated approximately 60 tokens as a peak 312 of skyline 302, based on the actual computational needs of the job. In some examples, skyline data may be extracted from historical run data 132/Allocation 308 represents the tokens that were guaranteed to the job—if the job were to need them. However, the job did not need the full number of guaranteed tokens, so the difference between peak 312 and allocation 308 is wasteful over-allocation 310.

According to FIG. 3A, user 108 paid for more tokens than were actually needed. The unused tokes may have been assigned as bonus tokens to other contemporaneously-executing jobs. Bonus tokens are tokens that are granted to a job that exceed that job's guaranteed allocation. Skyline 302 has a second peak 314, a dip 316, and a third peak 318. In some examples, job skylines may have significantly more peaks and valleys. The job completes at time 320, when skyline 302 reaches zero as a final value, as measured with respect to axis 304. This provides the runtime value.

Figure 3B:
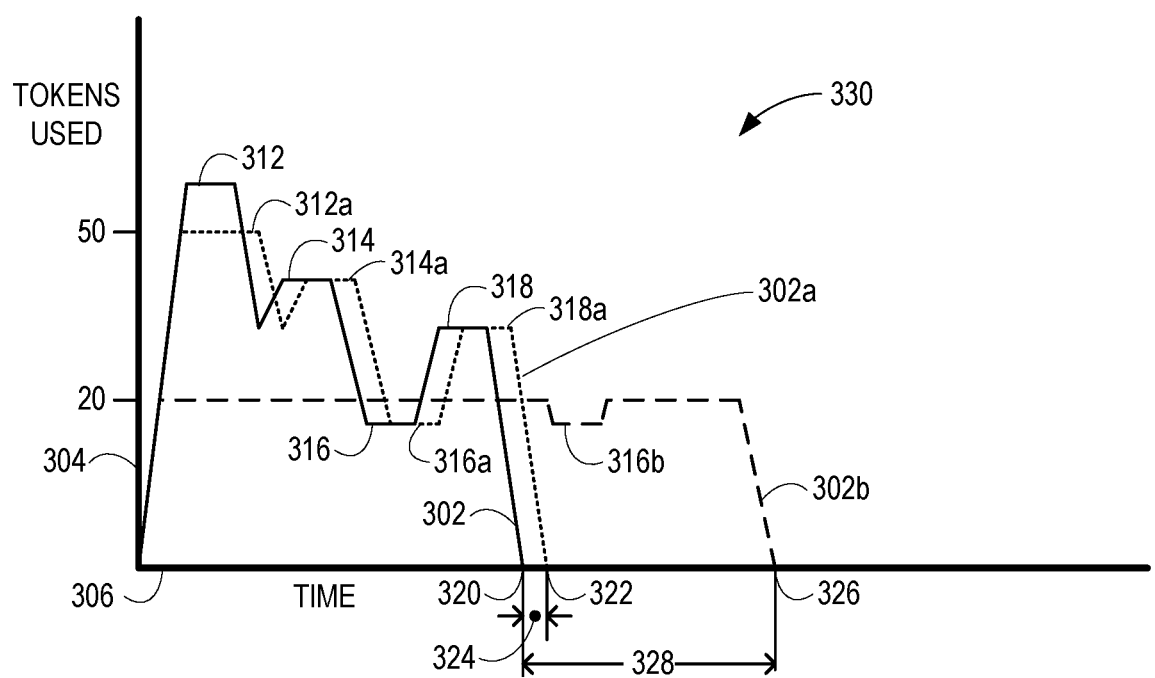
FIG. 3B illustrates generating simulated run data using the skyline data plotted in FIG. 3A.

FIG. 3B illustrates graphically how run times for different token counts may be determined, in a plot 330. A skyline 302a is shown as a dotted line for a token allocation of 50, which is below peak 312 of skyline 302. This means that some of the computational burden accomplished by tokens above the count of 50 (for skyline 302) is delayed in time. A peak 312a reaches the allocation of 50 tokens, but the delayed completion broadens peak 312a to longer in duration than peak 312. This pushes the remainder of skyline 302a to the right along axis 306, relative to skyline 302, so that skyline 302a has a later completion time 322 than completion time 320 for skyline 302. The difference between completion time 322 and completion time 320 is a time penalty 324 for allocating 50 tokens, which is below the peak number of token that can be used by the job.

Peak 314a, dip 316a, and peak 318a for skyline 302a are all below the allocation of 50 tokens, and so are not affected by the token constraint. A skyline 302b, shown as a dashed line, illustrates what happens when a lower allocation of 20 tokens is below peaks 312, 314, and 318. When capped at the lower number of tokens, a larger amount of the computational burden is delayed, and the delays are cumulative. Skyline 302b runs at or near the maximum of allocated tokens for an extended period of time, pushing dip 316b farther to the right along axis 306, relative to skyline 302. Skyline 302b has a later completion time 326 than completion time 320 for skyline 302. The difference between completion time 326 and completion time 320 is a time penalty 328 for allocating only 20 tokens. Runtimes for other token counts may be similarly simulated, to fill out simulated run data 138 more completely.

Returning to FIG. 1, simulated run data 138 augments training data 134, which is used by a trainer 140 to train token estimator 102, for example ML1, ML2, and/or ML3. Token estimator 102 has access to a version of compiler 124 in order to generate intermediate representation 144IR for user-submitted job 104. Job characteristics 144 for user-submitted job 104 include intermediate representation 144IR and other information, such as a job graph, operators, order of operators, and cardinalities of target data set 142, which indicates the size of data searched by user-submitted job 104 (e.g., size of target data set 142), and also data types in target data set 142. In some examples, intermediate representation 144IR includes operator and/or job costs, as estimated by optimizer 122. Job characteristics 144 are used by token estimator 102 to generate token prediction data 106, as described above.

In some examples, compiler 124 may be part of token estimator 102, whereas, in some examples, compiler 124 may be external, but accessible to token estimator 102. For example, compiler 124 may be within optimizer 122. In some examples, token estimator 102 is also within optimizer 122. When user 108 submits user-submitted job 104 to execution environment 112, user-submitted job 104 passes through optimizer 122 and compiler 124. This way, execution environment 112 is able to run an optimized manifestation of user-submitted job 104. Selected token count 110 is also provided to execution environment 112, either as user input from user 108, or as part of token prediction data 106 by token estimator 102.

Figure 4:
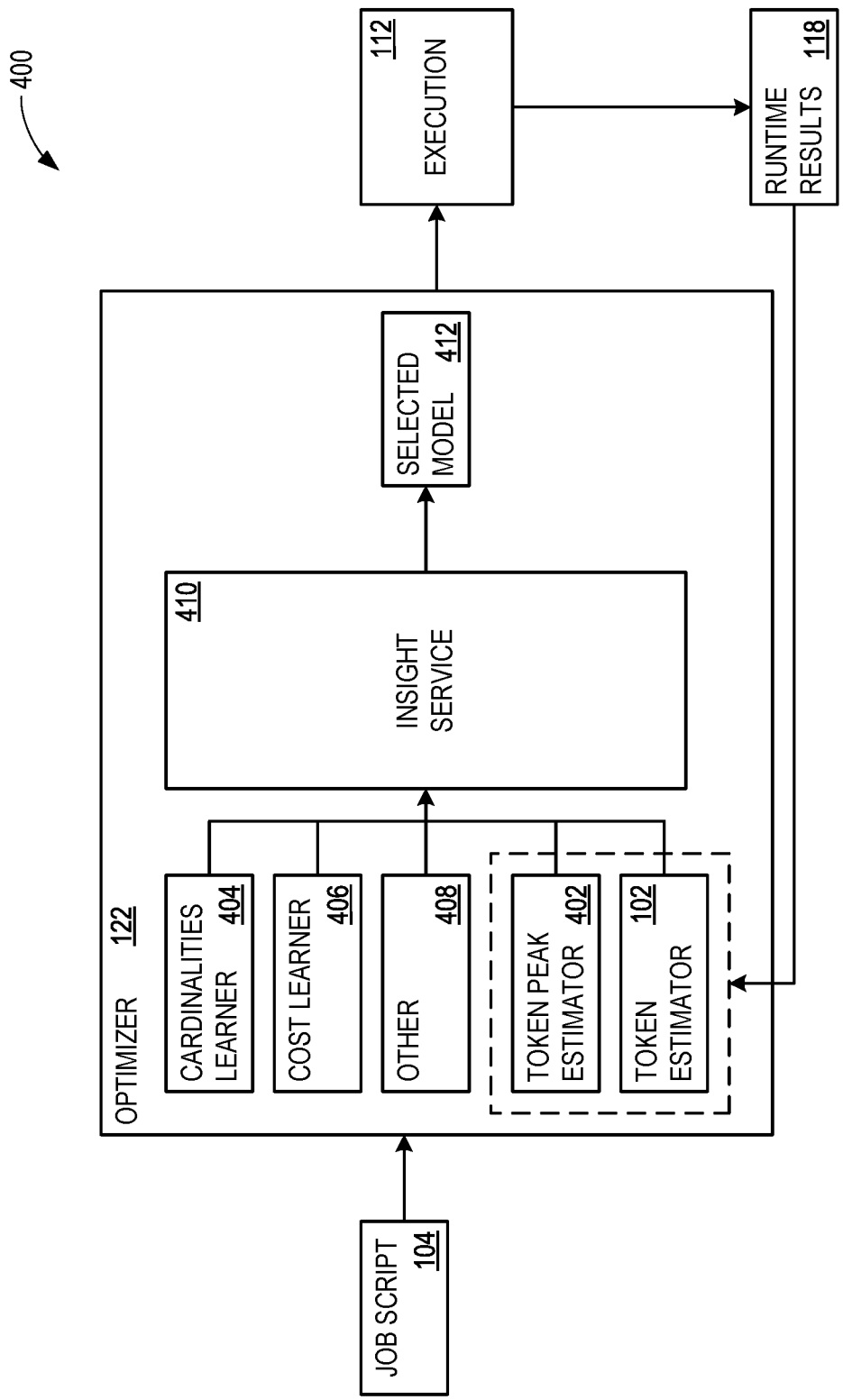
FIG. 4 illustrates an arrangement into which components of the arrangement of FIG. 1 may be integrated.

In some examples, token prediction data 106 from token estimator 102 is only one of multiple token allocation recommendations. FIG. 4 illustrates an arrangement 400 in which token estimator 102 may be used as a component. As illustrated in FIG. 4, token estimator 102 is within optimizer 122. When user-submitted job 104 is submitted, the job's metadata (intermediate representation 144IR and job graph information) is sent to optimizer 122. Various modules may analyze information related to user-submitted job 104, including token estimator 102 (as described above), a token peak estimator 402, a cardinalities learner 404, a cost learner 406, and other analysis components 408. These various modules use incoming data to create recommendations for an insight service 410 that selects a selected model 412 that provides its token allocation recommendation to execution environment 112. Runtime results 118 are used for further training for at least token estimator 102 and token peak estimator 402.

Token peak estimator 402 estimates peak token usage of a job, and is useful for recurring jobs. For example, when a particular job is executed with a first size data set, token peak estimator 402 tracks the peak token usage. When the same job script is submitted later, even with a different size data set, because token peak estimator 402 has seen the same job script previously, token peak estimator 402 is able to estimate the peak token usage of the job script in an upcoming execution. Cardinalities learner 404, cost learner 406, and other analysis components 408, provide alternative recommendations for an insight service 410.

Figure 5:
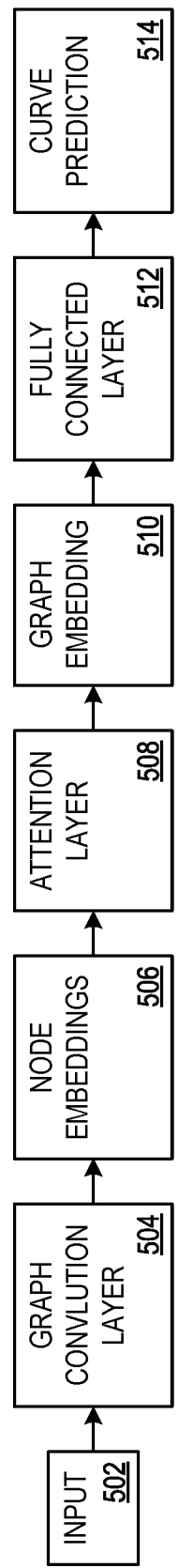
FIG. 5 illustrates an exemplary graphical neural network (GNN) architecture which may be used in the arrangement of FIG. 1.

FIG. 5 illustrates an exemplary GNN architecture 500, which may be used in arrangement 100 of FIG. 1. GNN architecture 500 architecture includes multiple stages. Input data 502 (operator level feature matrix and graph adjacency matrix) is passed to graph convolution networks (GCN) layer 504. A neighbor aggregation approach obtains node embeddings 506. Node embeddings 506 are fed into an attention layer 508, where the attention weight is related to the node's similarity to the global context. In some examples, global context is a nonlinear transformation of the weighted average of node embeddings 506, where weight is a learnable object. A graph embedding 510 includes the attention weighted sum of node embeddings 506. The job level convoluted embeddings are then passed to a multi-layer fully connected neural network layer 512 to predict the scores (performance characteristic curve parameter prediction 514). As described above, in relation to FIGS. 2A and 2B, curve parameter prediction 514 may be used to construct curve data 202, make runtime predictions, and provide recommended token count 208.

Figure 6A:
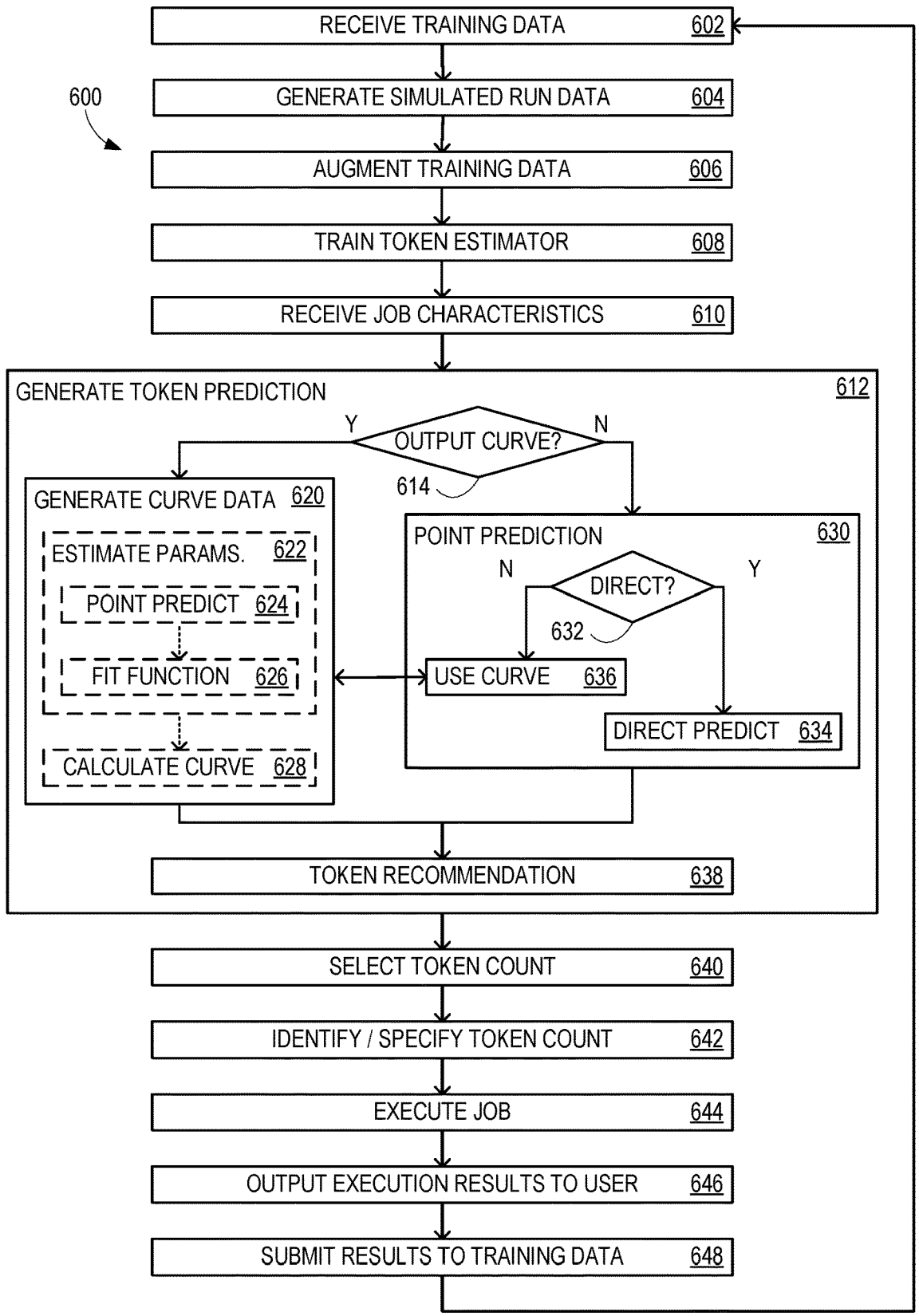
FIG. 6A is a flowchart illustrating exemplary operations involved in advantageously optimizing job runtimes with the arrangement of FIG. 1A.

FIG. 6A is a flowchart 600, illustrating exemplary operations involved in optimizing job runtimes via prediction-based token allocation. In some examples, operations described for flowchart 600 are performed by computing device 700 of FIG. 7. Flowchart 600 commences with operation 602, which includes receiving training data 134 comprising historical run data 132, historical run data 132 comprising job characteristics 130, runtime results 126, and a token count 128 for each of a plurality of prior jobs 120, and job characteristics 130 comprising an intermediate representation 120IR and job graph data. In some examples, a token corresponds to two cores and 6 GB of memory in execution environment 112. In some examples, a token corresponds to a different number of cores and a different amount of memory. In some examples, historical run data 132 comprises historical run data for a plurality of serverless queries. In some examples, job characteristics 130 further comprise a size of a data set searched in a query; a type of data in the data set searched in the query; an indication of operators used; and/or an indication of an order of the operators used.

Operation 604 includes generating simulated run data 138 based at least on historical run data 132 and constant token-seconds values. In some examples, generating simulated run data 138 comprises simulating runtime results based at least on historical job characteristics and a plurality of simulated token counts. In some examples, simulating runtime results comprises calculating the simulated runtime results based at least on historical skyline data corresponding to the historical job characteristics. Operation 606 includes augmenting training data 134 with simulated run data 138. Operation 608 includes, based at least on training data 134, training token estimator 102, token estimator 102 comprising an ML model (ML1, ML2, and/or ML3). In some examples, the ML model comprises at least one ML model selected from the list consisting of: XGBoost (ML1), a multi-layer fully connected NN (ML2), and a GNN (ML3).

Operation 610 includes receiving job characteristics 144 for user-submitted job 104, job characteristics 144 comprising intermediate representation 144IR and job graph data. In some examples, user-submitted job 104 comprises a serverless query. In some examples, job characteristics 144 further comprise a size of a data set (target data set 142) to be searched in a query; a type of data in the data set to be searched in the query; an indication of operators used;

and/or an indication of an order of the operators used. Operation 612 spans operations 614-638 and includes, based at least on received job characteristics 144, generating, with token estimator 102, token prediction data for user-submitted job 104.

In some examples, token prediction data 106 comprises an indication of a plurality of predicted runtimes, each predicted runtime corresponding to a selectable token count. This may include graphical presentation 200 relating the plurality of predicted runtimes with the selectable token counts, and/or a tabulated presentation relating the plurality of predicted runtimes with the selectable token counts. In some examples, token prediction data 106 comprises recommended token count 208. Recommended token count 208 may be provided as an annotation to graphical presentation 200 of token prediction data 106, or be provided as a single output value.

Within 612, decision 614 determines whether token prediction data 106 will be output as curve data 202 or just a single point. This may be a setting of token estimator 102 or a selection by user 108. If curve data 202 is to be provided, operation 620 (optionally comprising operations 622-628) includes generating monotonically non-increasing generating curve data 202 for user-submitted job 104, curve data 202 indicating a predicted runtime for each of a plurality of selectable token counts. In some examples, curve data 202 is generated directly (e.g., using ML2 and ML3). In some examples (e.g., using ML1), generating curve data 202 comprises estimating parameters of a power law function and calculating curve data 202 based at least on the power law function. In some examples, the power law function comprises a selectable token count value exponentiated by a first parameter and multiplied by a second parameter, the estimated parameters comprising the first parameter and the second parameter. In some examples, generating curve data 202 comprises using the multi-layer fully connected NN or the GNN as the ML model in token estimator 102. Operation 622 also includes multiple operations, 622-626. Operation 622 includes estimating parameters of the power law function (see FIGS. 2A, 2B and 5). Operation 624 includes determining initial point prediction runtimes for each of a plurality of token count values, and operation 626 includes fitting the power law function to the determined initial point prediction runtimes. With the function this determined, operation 628 includes calculating curve data 202 based at least on the power law function.

Alternatively, if token estimator 102 is only outputting a single point as token prediction data 106, operation 630 includes generating, for user-submitted job 104, a point prediction runtime value for an identified token count. This may be accomplished either by direct point prediction, or by generating curve data 202 (operation 620) and using curve data 202 to generate the point prediction runtime value. Decision 632 determines whether direct point prediction or curve data 202 will be used. If direct generation, operation 634 includes generating the point prediction runtime value using XGBoost (ML1) as the ML model in token estimator 102. Otherwise, operation 636 includes generating curve data 202 and calculating the point prediction runtime value from curve data 202. That is, flowchart 600 temporarily branches to operation 620, and then returns to operation 630. Optional operation 638 then includes providing recommended token count 208, if token estimator 102 is configured to provide a recommendation or user 108 had requested a recommendation.

Operation 640 includes selecting a token count (selected token count 110) for user-submitted job 104, based at least on token prediction data 106. In some examples, selecting the token count comprises receiving selected token count 110 through a user input. In some examples, selecting the token count comprises setting selected token count 110 based at least on recommended token count 208 in token prediction data 106. Operation 642 includes identifying selected token count 110 to execution environment 112. In some examples, recommended token count 208 is based at least on an inflection point of curve data 202. Operation 644 includes executing, with execution environment 112, user-submitted job 104 in accordance with selected token count 110. Operation 646 includes outputting execution results 116 for user-submitted job 104 to user 108, wherein a runtime for user-submitted job 104 is based at least on selected token count 110. Operation 648 includes submitting, into training data 134 (via historical run data 132), runtime results 118 for user-submitted job 104, job characteristics 144 for user-submitted job 104, and selected token count 110 for user-submitted job 104. Flowchart 600 then returns to operation 602 for the next job.

Figure 6B:
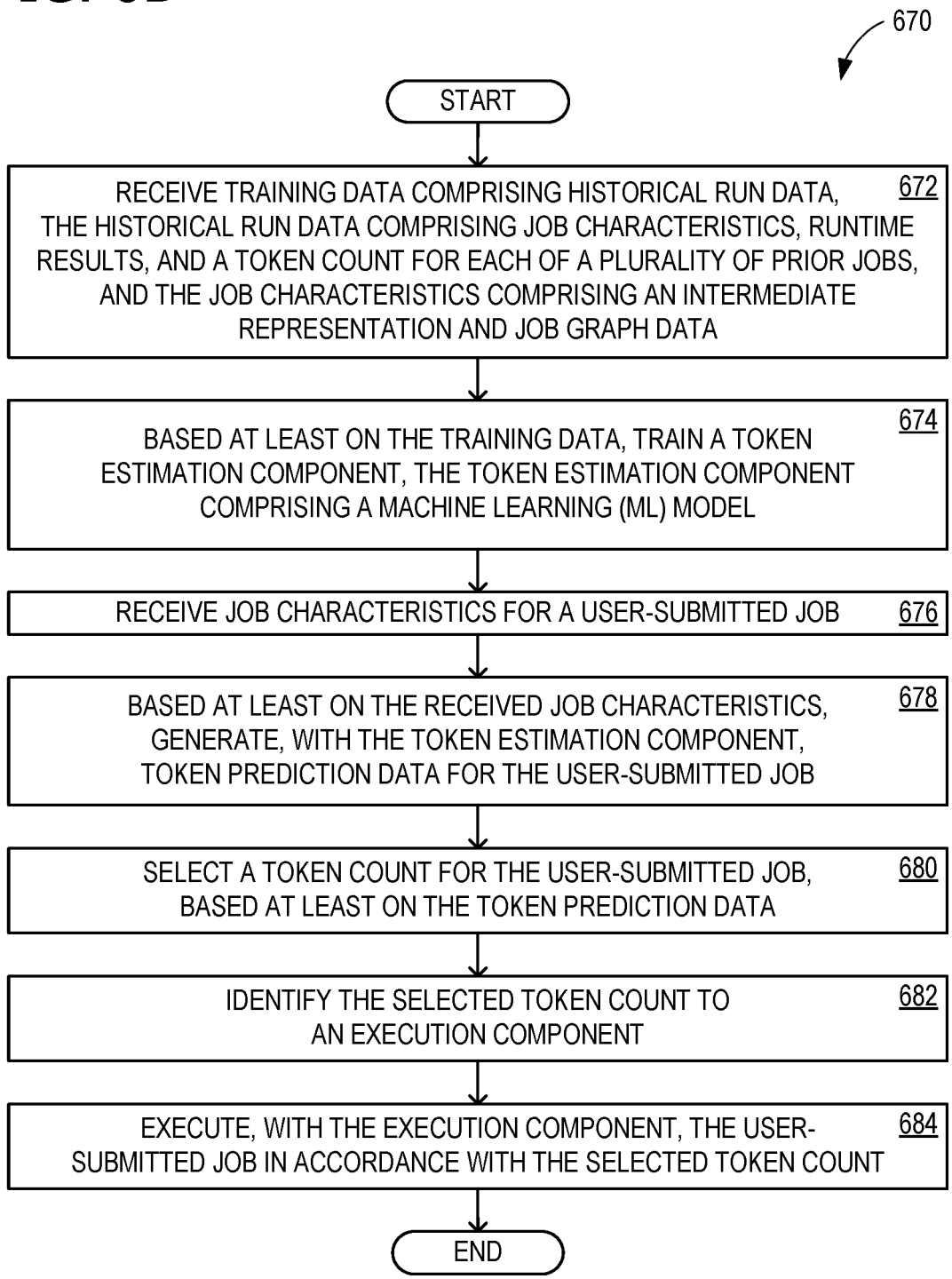
FIG. 6B is another flowchart illustrating exemplary operations involved in advantageously optimizing job runtimes with the arrangement of FIG. 1A.

FIG. 6B is a flowchart 670, also illustrating exemplary operations involved in optimizing job runtimes via prediction-based token allocation. In some examples, operations described for flowchart 670 are performed by computing device 700 of FIG. 7. Flowchart 670 commences with operation 672, which includes receiving training data comprising historical run data, the historical run data comprising job characteristics, runtime results, and a token count for each of a plurality of prior jobs, and the job characteristics comprising an intermediate representation and job graph data. Operation 674 includes, based at least on the training data, training a token estimator, the token estimator comprising an ML model.

Operation 676 includes receiving job characteristics for a user-submitted job. Operation 678 includes, based at least on the received job characteristics, generating, with the token estimator, token prediction data for the user-submitted job. Operation 680 includes selecting a token count for the user-submitted job, based at least on the token prediction data. Operation 682 includes identifying the selected token count to an execution environment. Operation 684 includes executing, with the execution environment, the user-submitted job in accordance with the selected token count.

Additional Examples

An exemplary system for optimizing job runtimes comprises: a processor; and a computer-readable medium storing instructions that are operative upon execution by the processor to: receive training data comprising historical run data, the historical run data comprising job characteristics, runtime results, and a token count for each of a plurality of prior jobs, and the job characteristics comprising an intermediate representation and job graph data; based at least on the training data, train a token estimator, the token estimator comprising an ML model; receive job characteristics for a user-submitted job; based at least on the received job characteristics, generate, with the token estimator, token prediction data for the user-submitted job; select a token count for the user-submitted job, based at least on the token prediction data; identify the selected token count to an execution environment; and execute, with the execution environment, the user-submitted job in accordance with the selected token count.

An exemplary method of optimizing job runtimes comprises: receiving training data comprising historical run data, the historical run data comprising job characteristics, runtime results, and a token count for each of a plurality of prior jobs, and the job characteristics comprising an intermediate representation and job graph data; based at least on the training data, training a token estimator, the token estimator comprising an ML model; receiving job characteristics for a user-submitted job; based at least on the received job characteristics, generating, with the token estimator, token prediction data for the user-submitted job; selecting a token count for the user-submitted job, based at least on the token prediction data; identifying the selected token count to an execution environment; and executing, with the execution environment, the user-submitted job in accordance with the selected token count.

One or more exemplary computer storage devices have computer-executable instructions stored thereon, which, on execution by a computer, cause the computer to perform operations comprising: receiving training data comprising historical run data, the historical run data comprising job characteristics, runtime results, and a token count for each of a plurality of prior jobs, and the job characteristics comprising an intermediate representation and job graph data; based at least on the training data, training a token estimator, the token estimator comprising an ML model; receiving job characteristics for a user-submitted job; based at least on the received job characteristics, generating, with the token estimator, token prediction data for the user-submitted job; selecting a token count for the user-submitted job, based at least on the token prediction data; identifying the selected token count to an execution environment; and executing, with the execution environment, the user-submitted job in accordance with the selected token count.

Alternatively, or in addition to the other examples described herein, examples include any combination of the following:

- the user-submitted job comprises a serverless query;
- the historical run data comprises historical run data for a plurality of serverless queries;
- the job characteristics further comprise a size of a data set searched in a query;
- the job characteristics further comprise a type of data in the data set searched in the query;
- the job characteristics further comprise an indication of operators used;
- the job characteristics further comprise an indication of an order of the operators used;
- outputting execution results for the user-submitted job, wherein a runtime for the user-submitted job is based at least on the selected token count;
- returning the execution results to a user;
- submitting, into the training data, a runtime for the user-submitted job, the job characteristics for the user-submitted job, and the selected token count for the user-submitted job;
- selecting the token count comprises receiving the selected token count through a user input;
- selecting the token count comprises setting the selected token count based at least on a recommended token count in the token prediction data;
- the token prediction data comprises an indication of a plurality of predicted runtimes, each predicted runtime corresponding to a selectable token count;
- the token prediction data comprises a graphical presentation relating the plurality of predicted runtimes with the selectable token counts;
- the token prediction data comprises a tabulated presentation relating the plurality of predicted runtimes with the selectable token counts;
- the token prediction data comprises the recommended token count;
- the recommended token count is provided as an annotation to the graphical presentation of the token prediction data;
- the recommended token count is provided as a single output value;
- generating monotonically non-increasing curve data for the user-submitted job, the curve data indicating a predicted runtime for each of a plurality of selectable token counts;
- generating, for the user-submitted job, a point prediction runtime value for an identified token count;
- generating the curve data comprises estimating parameters of a power law function and calculating the curve data based at least on the power law function;
- the power law function comprises a selectable token count value exponentiated by a first parameter and multiplied by a second parameter, the estimated parameters comprising the first parameter and the second parameter;
- estimating the estimated parameters comprises determining initial point prediction runtimes for each of a plurality of token count values and fitting the power law function to the determined initial point prediction runtimes;
- generating the point prediction runtime value comprises generating the curve data and calculating the point prediction runtime value from the curve data;
- the recommended token count is based at least on an inflection point of the curve data;
- the ML model comprises at least one ML model selected from the list consisting of: XGBoost, a multi-layer fully connected NN, and a GNN;
- generating the curve data comprises using the multi-layer fully connected NN or the GNN as the ML model in the token estimator;
- generating the point prediction runtime value comprises using XGBoost as the ML model in the token estimator;
- generating simulated run data based at least on the historical run data;
- augmenting the training data with the simulated run data;
- generating the simulated run data comprises simulating runtime results based at least on historical job characteristics and a plurality of simulated token counts;
- simulating runtime results comprises calculating the simulated runtime results based at least on historical skyline data corresponding to the historical job characteristics;
- the user-submitted job comprises an ad hoc job; and
- a token corresponds to two cores and 6 GB of memory in the execution environment.

While the aspects of the disclosure have been described in terms of various examples with their associated operations, a person skilled in the art would appreciate that a combination of operations from any number of different examples is also within scope of the aspects of the disclosure.

Example Operating Environment

Figure 7:
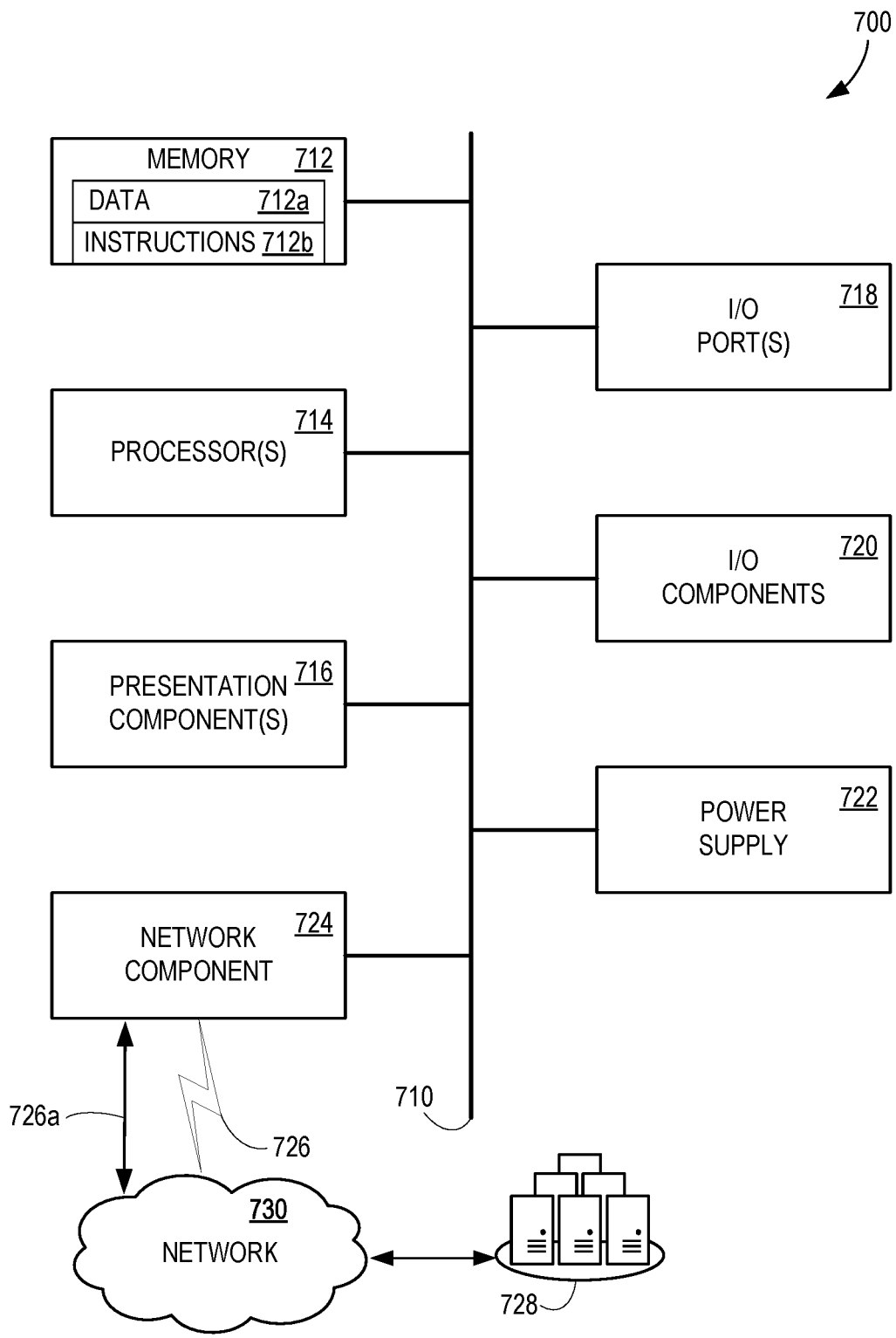
FIG. 7 is a block diagram of an example computing environment suitable for implementing some of the various examples disclosed herein.

FIG. 7 is a block diagram of an example computing device 700 for implementing aspects disclosed herein, and is designated generally as computing device 700. Computing device 700 is but one example of a suitable computing environment and is not intended to suggest any limitation as to the scope of use or functionality of the examples disclosed herein. Neither should computing device 700 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 700 includes a bus 710 that directly or indirectly couples the following devices: computer-storage memory 712, one or more processors 714, one or more presentation components 716, input/output (I/O) ports 718, I/O components 720, a power supply 722, and a network component 724. While computing device 700 is depicted as a seemingly single device, multiple computing devices 700 may work together and share the depicted device resources. For example, memory 712 may be distributed across multiple devices, and processor(s) 714 may be housed with different devices.

Bus 710 represents what may be one or more busses (such as an address bus, data bus, or a combination thereof). Although the various blocks of FIG. 7 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 7 and the references herein to a "computing device." Memory 712 may take the form of the computer-storage media references below and operatively provide storage of computer-readable instructions, data structures, program modules and other data for the computing device 700. In some examples, memory 712 stores one or more of an operating system, a universal application platform, or other program modules and program data. Memory 712 is thus able to store and access data 712a and instructions 712b that are executable by processor 714 and configured to carry out the various operations disclosed herein.

In some examples, memory 712 includes computer-storage media in the form of volatile and/or nonvolatile memory, removable or non-removable memory, data disks in virtual environments, or a combination thereof. Memory 712 may include any quantity of memory associated with or accessible by the computing device 700. Memory 712 may be internal to the computing device 700 (as shown in FIG. 7), external to the computing device 700 (not shown), or both (not shown). Examples of memory 712 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 700. Additionally, or alternatively, the memory 712 may be distributed across multiple computing devices 700, for example, in a virtualized environment in which instruction processing is carried out on multiple devices 700. For the purposes of this disclosure, "computer storage media," "computer-storage memory," "memory," and "memory devices" are synonymous terms for the computer-storage memory 712, and none of these terms include carrier waves or propagating signaling.

Processor(s) 714 may include any quantity of processing units that read data from various entities, such as memory 712 or I/O components 720. Specifically, processor(s) 714 are programmed to execute computer-executable instructions for implementing aspects of the disclosure. The instructions may be performed by the processor, by multiple processors within the computing device 700, or by a processor external to the client computing device 700. In some examples, the processor(s) 714 are programmed to execute instructions such as those illustrated in the flow charts discussed below and depicted in the accompanying drawings. Moreover, in some examples, the processor(s) 714 represent an implementation of analog techniques to perform the operations described herein. For example, the operations may be performed by an analog client computing device 700 and/or a digital client computing device 700. Presentation component(s) 716 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 700, across a wired connection, or in other ways. I/O ports 718 allow computing device 700 to be logically coupled to other devices including I/O components 720, some of which may be built in. Example I/O components 720 include, for example but without limitation, a microphone, joystick, game pad, satellite dish, scanner, printer, wireless device, etc.

The computing device 700 may operate in a networked environment via the network component 724 using logical connections to one or more remote computers. In some examples, the network component 724 includes a network interface card and/or computer-executable instructions (e.g., a driver) for operating the network interface card. Communication between the computing device 700 and other devices may occur using any protocol or mechanism over any wired or wireless connection. In some examples, network component 724 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 724 communicates over wireless communication link 726 and/or a wired communication link 726a to a cloud resource 728 across network 730. Various different examples of communication links 726 and 726a include a wireless connection, a wired connection, and/or a dedicated link, and in some examples, at least a portion is routed through the internet.

In some examples, the computing apparatus detects voice input, user gestures or other user actions and provides a natural user interface (NUI). This user input may be used to author electronic ink, view content, select ink controls, play videos with electronic ink overlays and for other purposes. The input/output component outputs data to devices other than a display device in some examples, e.g. a locally connected printing device. NUI technology enables a user to interact with the computing apparatus in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (RGB) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Although described in connection with an example computing device 700, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method comprising:
    receiving training data comprising historical run data, the historical run data comprising job characteristics, runtime results, and token counts for a plurality of prior jobs, the job characteristics comprising an intermediate representation of job scripts for the plurality of prior jobs generated by a compiler and job graph data, the token counts for the plurality of prior jobs comprising a number of virtual machine cores and an amount of memory;
generating simulated run data based at least on the historical run data including the intermediate representation, the simulated run data including runtimes for each of the plurality of prior jobs in the historical run data for a plurality of simulated token counts;
augmenting the training data with the simulated run data including the runtimes;
based at least on the augmented training data, training a token estimator, the token estimator comprising a machine learning (ML) model;
receiving the intermediate representation and the job graph data for a user-submitted job;
based at least on executing the received intermediate representation and the job graph data, generating, with the token estimator, token prediction data for the user-submitted job;
selecting, from the token counts for the plurality of prior jobs, a token count including the number of virtual machine cores and the amount of memory for the user-submitted job, based at least on the token prediction data;
identifying the selected token count including the number of virtual machine cores and the amount of memory to an execution environment; and
executing, with the execution environment, the user-submitted job in accordance with the selected token count including the number of virtual machine cores and the amount of memory.

2. The method of claim 1, further comprising:
outputting execution results for the user-submitted job, wherein a runtime for the user-submitted job is based at least on the selected token count.

3. The method of claim 1, wherein selecting the token count comprises:
receiving the selected token count through a user input; or
setting the selected token count based at least on a recommended token count in the token prediction data.

4. The method of claim 1, wherein generating token prediction data comprises:
generating monotonically non-increasing curve data for the user-submitted job, the curve data indicating a predicted runtime for each of a plurality of selectable token counts; or
generating, for the user-submitted job, a point prediction runtime value for an identified token count.

5. The method of claim 1, wherein the ML model comprises at least one ML model selected from a list comprising:
a multi-layer fully connected neural network (NN) or a graph neural network (GNN).

6. The method of claim 1, wherein the runtimes for the each of the plurality of prior jobs are calculated based on an area under a job skyline being constant.

7. The method of claim 1, wherein the user-submitted job comprises an ad hoc job.

8. A system comprising:
a processor; and
a computer-readable medium storing instructions that are operative upon execution by the processor to:
receive training data comprising historical run data, the historical run data comprising job characteristics, runtime results, and token counts for a plurality of prior jobs, the job characteristics comprising an intermediate representation of job scripts for the plurality of prior jobs generated by a compiler and job graph data, the token counts for the plurality of prior jobs comprising a number of virtual machine cores and an amount of memory;
generate simulated run data based at least on the historical run data including the intermediate representation, the simulated run data including runtimes for each of the plurality of prior jobs in the historical run data for a plurality of simulated token counts;
augment the training data with the simulated run data including the runtimes;
based at least on the augmented training data, train a token estimator, the token estimator comprising a machine learning (ML) model;
receive the intermediate representation and the job graph data for a user-submitted job;
based at least on executing the received intermediate representation and the job graph data, generate, with the token estimator, token prediction data for the user-submitted job;
select, from the token counts for the plurality of prior jobs, a token count including the number of virtual machine cores and the amount of memory for the user-submitted job, based at least on the token prediction data;
identify the selected token count including the number of virtual machine cores and the amount of memory to an execution environment; and
execute, with the execution environment, the user-submitted job in accordance with the selected token count including the number of virtual machine cores and the amount of memory.

9. The system of claim 8, wherein the instructions are further operative to:
output execution results for the user-submitted job, wherein a runtime for the user-submitted job is based at least on the selected token count.

10. The system of claim 8, wherein selecting the token count comprises:
receiving the selected token count through a user input; or
setting the selected token count based at least on a recommended token count in the token prediction data.

11. The system of claim 8, wherein generating token prediction data comprises:
generating monotonically non-increasing curve data for the user-submitted job, the curve data indicating a predicted runtime for each of a plurality of selectable token counts; or
generating, for the user-submitted job, a point prediction runtime value for an identified token count.

12. The system of claim 8, wherein the ML model comprises at least one ML model selected from a list comprising:
a multi-layer fully connected neural network (NN) or a graph neural network (GNN).

13. The system of claim 8, wherein the runtimes for the plurality of prior jobs are calculated based on an area under a job skyline being constant.

14. The system of claim 8, wherein the instructions are further operative to:
provide a graphical representation of the token prediction data, the graphical representation including a plurality of expected performance levels available for the user-submitted job and a cost associated with each of the plurality of expected performance levels; and
provide a recommended token count as an annotation to the graphical representation.

15. One or more computer storage devices having computer-executable instructions stored thereon, which, on execution by a computer, cause the computer to perform operations comprising:

receiving training data comprising historical run data, the historical run data comprising job characteristics, runtime results, and token counts for a plurality of prior jobs, the job characteristics comprising an intermediate representation of job scripts for the plurality of prior jobs generated by a compiler and job graph data, the token counts for the plurality of prior jobs comprising a number of virtual machine cores and an amount of memory;

generating simulated run data based at least on the historical run data including the intermediate representation, the simulated run data including runtimes for each of the plurality of prior jobs in the historical run data for a plurality of simulated token counts;

augmenting the training data with the simulated run data including the runtimes;

based at least on the augmented training data, training a token estimator, the token estimator comprising a machine learning (ML) model;

receiving the intermediate representation and the job graph data for a user-submitted job;

based at least on executing the received intermediate representation and the job graph data, generating, with the token estimator, token prediction data for the user-submitted job;

selecting, from the token counts for the plurality of prior jobs, a token count including the number of virtual machine cores and the amount of memory for the user-submitted job, based at least on the token prediction data;

identifying the selected token count including the number of virtual machine cores and the amount of memory to an execution environment; and executing, with the execution environment, the user-submitted job in accordance with the selected token count including the number of virtual machine cores and the amount of memory.

16. The one or more computer storage devices of claim 15, wherein the operations further comprise:

outputting execution results for the user-submitted job, wherein a runtime for the user-submitted job is based at least on the selected token count.

17. The one or more computer storage devices of claim 15, wherein selecting the token count comprises:

receiving the selected token count through a user input; or setting the selected token count based at least on a recommended token count in the token prediction data.

18. The one or more computer storage devices of claim 15, wherein generating token prediction data comprises:

generating monotonically non-increasing curve data for the user-submitted job, the curve data indicating a predicted runtime for each of a plurality of selectable token counts; or generating, for the user-submitted job, a point prediction runtime value for an identified token count.

19. The one or more computer storage devices of claim 15, wherein the ML model comprises at least one ML model selected from a list comprising:

a multi-layer fully connected neural network (NN) or a graph neural network (GNN).

20. The one or more computer storage devices of claim 15, wherein the runtimes for the plurality of prior jobs are calculated based on an area under a job skyline being constant.

* * * * *